United States Patent [19]

White

[11] Patent Number: 4,485,976

[45] Date of Patent: Dec. 4, 1984

[54] MATERIAL CHOPPING APPARATUS

[76] Inventor: Allen A. White, Rte. 2, Box 9, Peabody, Kans. 66866

[21] Appl. No.: 376,225

[22] Filed: May 7, 1982

[51] Int. Cl.³ .......................................... B02C 13/286
[52] U.S. Cl. .............................. 241/186.2; 241/101.7; 241/186.4; 241/189 R
[58] Field of Search .................... 241/73, 186.2, 186.3, 241/186.4, 186 R, 101.7, 189 R, 277, 279–282

[56] References Cited

U.S. PATENT DOCUMENTS

| | | |
|---|---|---|
| 2,512,096 | 6/1950 | Endsley . |
| 2,650,745 | 9/1953 | Oberwortman . |
| 2,938,674 | 5/1960 | Lee . |
| 3,615,059 | 6/1971 | Moeller . |
| 3,946,952 | 3/1976 | Martin . |
| 3,966,128 | 6/1976 | Anderson et al. ........... 241/186.2 X |
| 3,979,074 | 9/1976 | White et al. . |
| 4,087,051 | 5/1978 | Moeller . |
| 4,088,272 | 5/1978 | Grillot . |
| 4,106,706 | 8/1978 | Burrows ...................... 241/186.4 X |
| 4,134,554 | 1/1979 | Morlock ........................ 241/186 R |
| 4,151,961 | 5/1979 | Makofka et al. . |

Primary Examiner—Mark Rosenbaum
Attorney, Agent, or Firm—Kokjer, Kircher, Bradley, Wharton, Bowman & Johnson

[57] ABSTRACT

An improved tub chopper is disclosed having a speed sensing device which automatically slows the tub sidewall speed responsive to slugging or slowing of the chopping apparatus. A positive drive to the tub sidewall is provided by means of an economically constructed undulated band secured to the sidewall and operable through a plurality of rollers on a rotating wheel to drive the sidewall. The tub floor is configured with an upwardly convex, gradually tapering shape terminating in an adjustable wing extension for enhancing the movement of material in the tub into the chopping station. Novel chopping knife construction maximizes the effective life of the chopping knives. One knife embodiment presents six different available cutting surfaces and another embodiment involves disc shaped knives wherein the entire disc periphery is utilized for cutting material. The discs are continually rotated to change the portion of the cutting edge which is in material cutting position.

5 Claims, 16 Drawing Figures

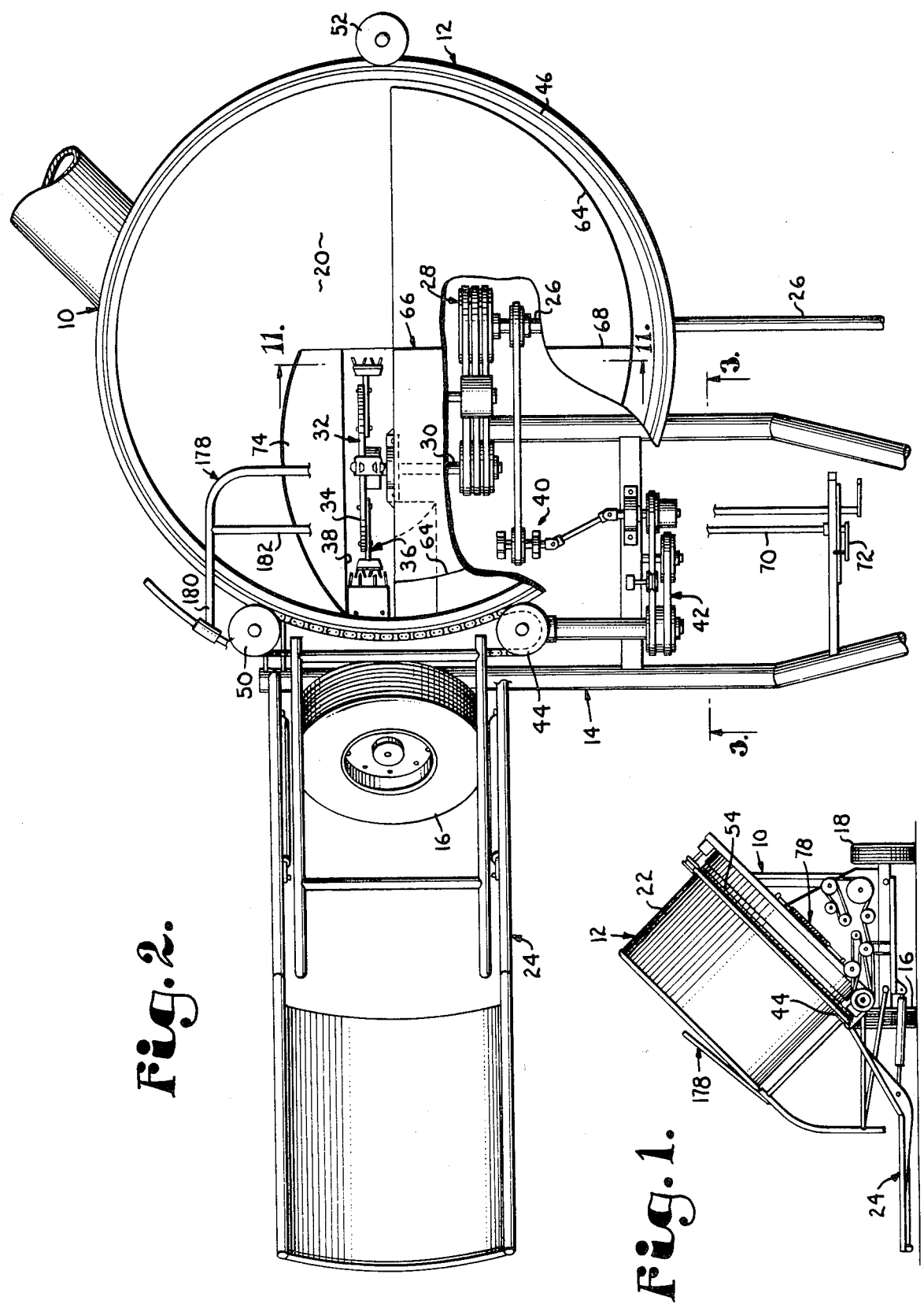

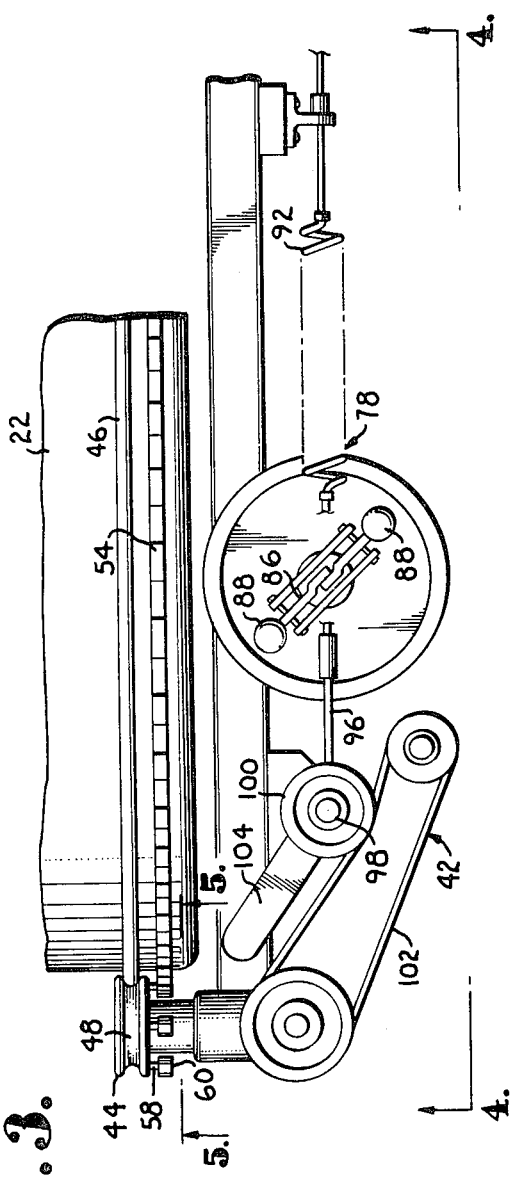
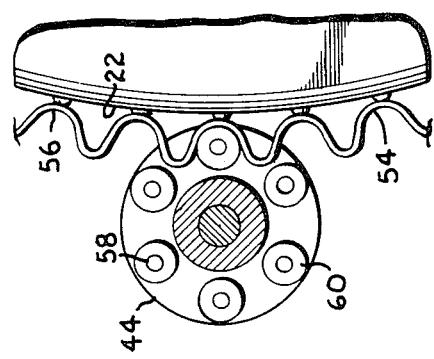
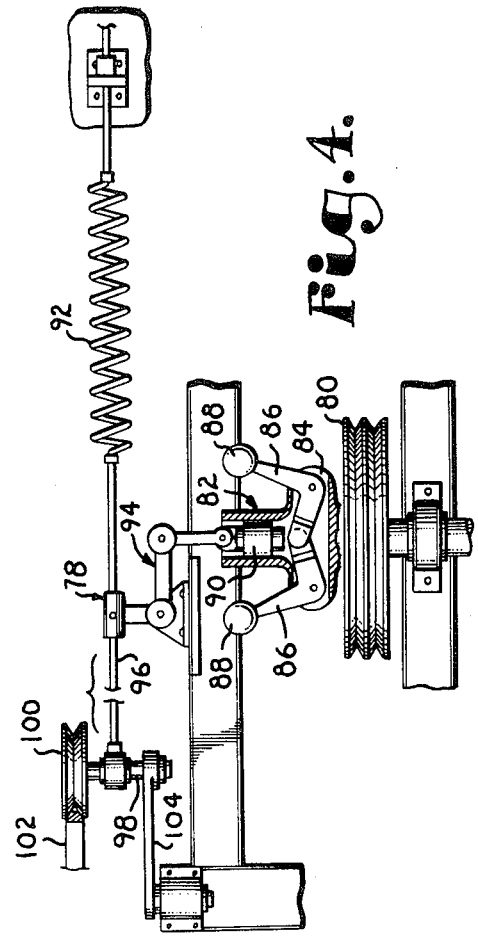

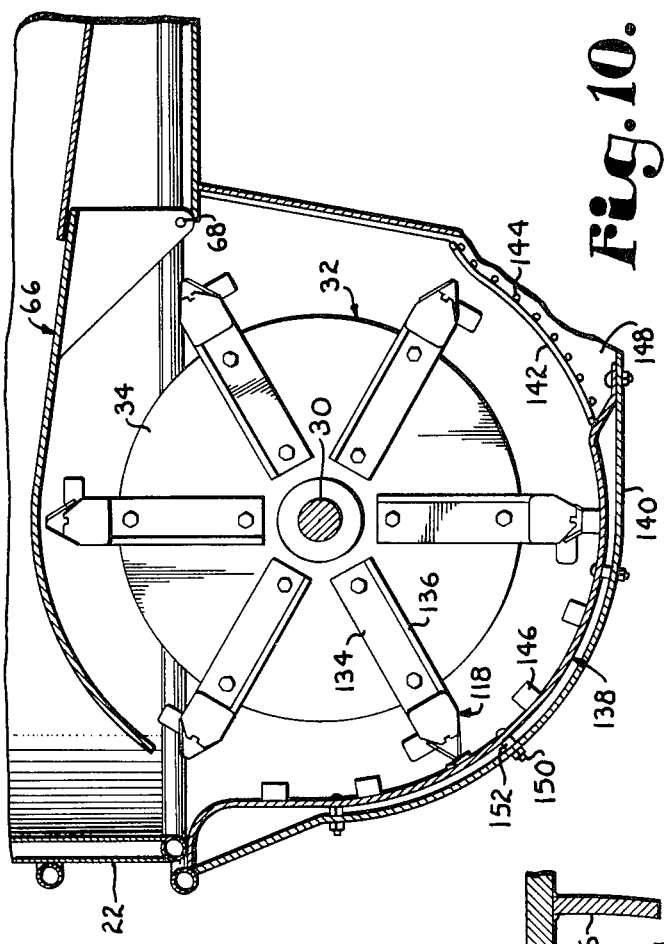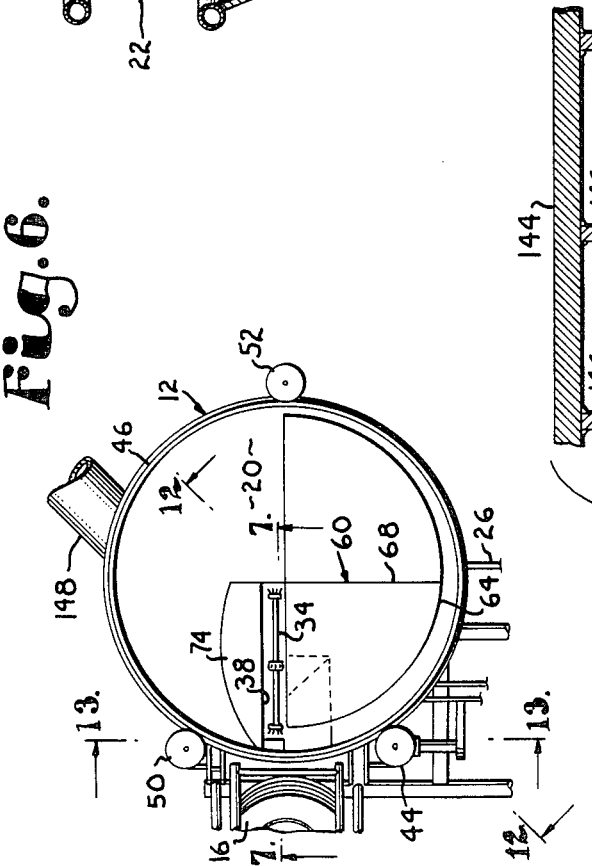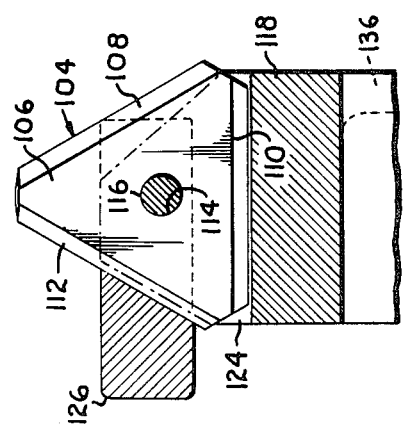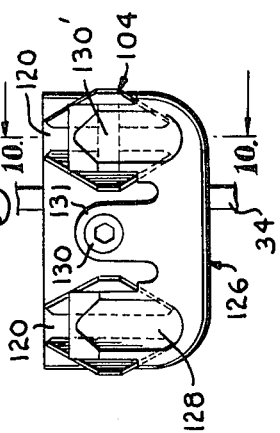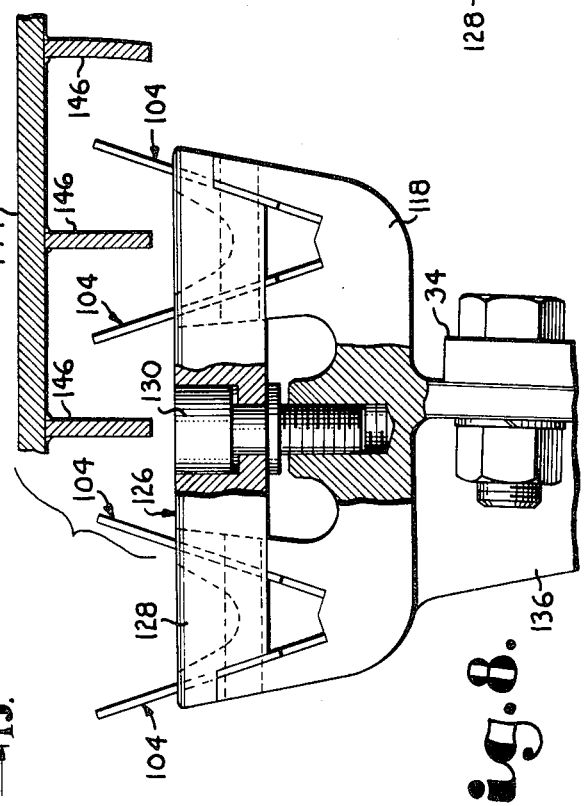

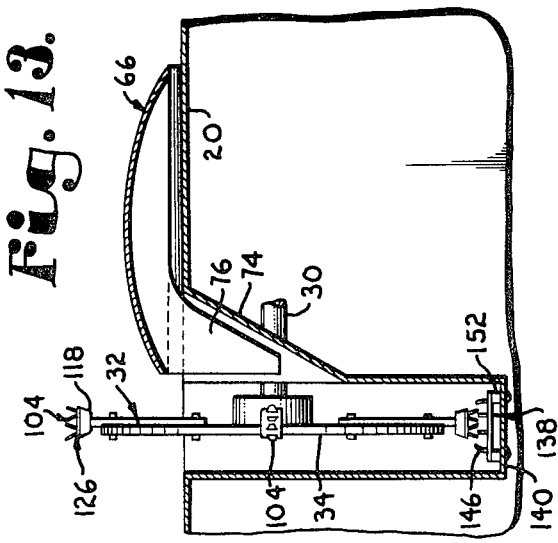
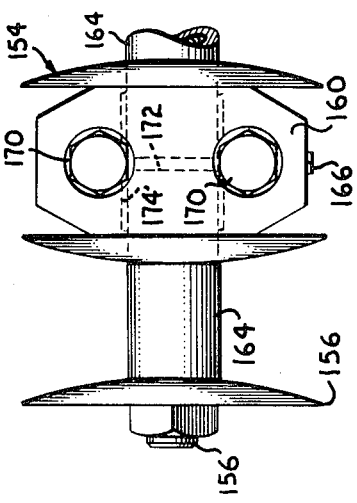
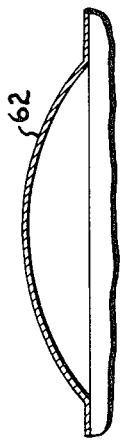
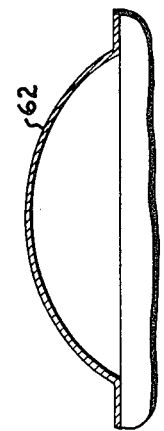
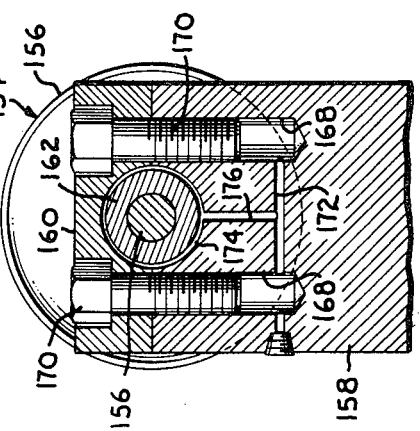
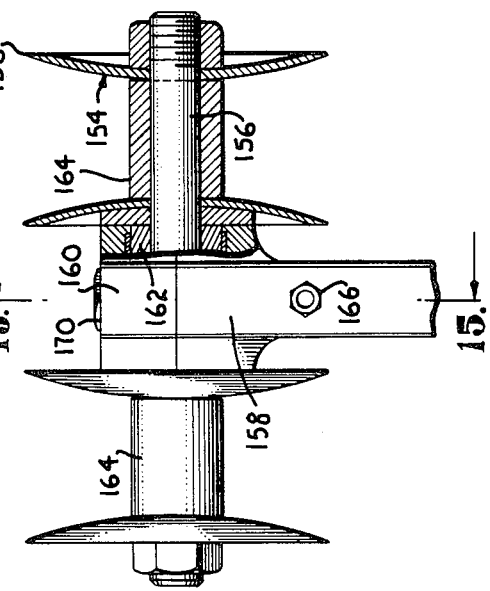

MATERIAL CHOPPING APPARATUS

This invention relates to material comminution apparatus, and more particularly to improvements in apparatus for grinding or chopping material such as animal feed crops or the like.

In my co-pending application Ser. No. 229,347 filed Jan. 29, 1981, now U.S. Pat. No. 4,364,526 I disclose an improved tub grinding or chopping apparatus. The present application pertains to certain improvements which can be used in association with the apparatus disclosed in said earlier application, which disclosure is incorporated herein by reference. The improvements of this invention may also be useful with other types of apparatus.

One significant problem confronting the users of all kinds of comminuting equipment is the rapid rate at which the material cutting knives become worn or dull. Typically the chopping action is carried out by means of a rapidly rotating drum or wheel which carries a plurality of knives moving on a path of travel to engage and sever the material to be processed by the apparatus. Often such material is hay, fodder, straw or other crop material which has a tendency to wear the sharpened knife edges until they are dull and no longer well suited for severing the material. When this occurs, the horsepower requirements for operating the machine rise substantially and the quality of the chopping action deteriorates into more of a shredding or tearing action than is ordinarily desired.

Until now, it has generally been necessary for the machine operator to change out the worn knives, replacing them with new sharpened knives, after they have become dull. This represents a substantial cost to the user of the machine, the alleviation of which can materially improve the efficiency of the overall operation.

Accordingly, it is a primary object of the present invention to provide a new type of knife and knife holder for apparatus of this type and which is designed to increase the period of useful life from a set of such knives before they must be discarded and replaced.

In the accomplishment of the foregoing object, it is another object of the instant invention to provide a novel knife construction wherein a plurality of sharpened cutting edges are provided around the periphery of the knife, the knife holder being adapted for manipulation in a manner to quickly move the dulled edge from its cutting position and the movement of a sharp edge into its place.

A further object of the invention is to provide such a knife wherein the advantages mentioned above can be utilized with any of a wide variety of cutting devices such as sickle bar mowers, harvesters and the like.

Still another important object of the present invention, attainable with one embodiment of the invention, is to provide such knives wherein the entire periphery of each knife is sharpened and the knives are mounted in a manner wherein the portion of the sharpened edge presented for cutting the material is continuously and automatically changed during the cutting operation, thereby insuring maximum life for the knives and minimizing down time for knife replacement.

Another object of the present invention is to provide in a tub chopper of this type, an improved floor construction to insure that the material is fed evenly an uniformly to the cutting or grinding apparatus for optimum results. The novel floor construction insures that the material in the tub does not tend to "bridge" the cutting apparatus and cause stoppages in the uniform feeding of material through the machine.

Still a further object of the present invention is to provide in such a machine an improved grid structure associated with the rotary chopping apparatus to enhance the chopping operation and to resist the possibility for relatively long strands of material to enter the discharge conveyor before they have been properly reduced to the appropriate size.

It is another object of the present invention to provide a tub chopper of the type disclosed having an automatic speed control operable to reduce the speed of rotation of the tub sidewall responsive to reductions in the rotary speed of the comminutor device in order to reduce the rate at which material is fed to the comminutor during periods when it is fully loaded, thereby minimizing any tendency for the apparatus to "slug" or become overloaded.

A further object of the present invention is to provide a positive drive for the tub sidewall which drive is relatively economical to fabricate yet which obviates any tendency for slippage to occur during sidewall rotation.

These and other important aims and objectives of the present invention will be further explained or will become apparent from the following explanation and description of the drawings, wherein:

FIG. 1 is a front elevational view on a reduced scale of a tub chopper embodying the principles of this invention;

FIG. 2 is a fragmentary top plan view taken axially of the tub and showing the machine of FIG. 1, parts being broken away to reveal details of construction;

FIG. 3 is an enlarged, fragmentary view taken along line 3—3 of FIG. 2;

FIG. 4 is a fragmentary view taken along line 4—4 of FIG. 3, parts being broken away and shown in cross-section to reveal details of construction;

FIG. 5 is an enlarged fragmentary detailed, cross-sectional view;

FIG. 6 is a fragmentary view similar to FIG. 2 but on a reduced scale, and showing the contoured tub floor;

FIG. 7 is an enlarged, detailed, fragmentary cross-sectional view taken along line 7—7 of FIG. 6;

FIG. 8 is a still further enlarged fragmentary, end elevational view of the rotary chopper illustrating the mounting for one form of chopper knives, parts being broken away and appearing in cross-section to reveal details of construction, a portion of the grid associated with the rotary chopper being shown fragmentarily to illustrate the cooperation of elements;

FIG. 9 is a fragmentary, top plan view of the chopper wheel of FIG. 8, shown on a reduced scale, and illustrating one of the knife assemblies;

FIG. 10 is a detailed, fragmentary cross-sectional view, on an enlarged scale, taken along line 10—10 of FIG. 9;

FIG. 11 is a fragmentary, cross-sectional view taken along line 11—11 of FIG. 2;

FIG. 12 is a view similar to FIG. 11 but taken along line 12—12 of FIG. 6;

FIG. 13 is a detailed fragmentary view taken along line 13—13 of FIG. 6 and on the same scale as FIGS. 11 and 12;

FIG. 14 is a view similar to FIG. 8, but illustrating a modified form of holder and knife assembly, the grid being omitted for clarity;

FIG. 15 is a detailed, fragmentary, cross-sectional view taken along line 15—15 of FIG. 14; and FIG. 16 is a fragmentary, top plan view of the knife assembly appearing in FIGS. 14 and 15.

Referring initially to FIGS. 1 and 2, apparatus embodying the principals of this invention is broadly designated by the reference numeral 10 and includes a tub 12 mounted on a frame 14 which is, in turn, carried by wheels 16 and 18 for transport as may be required. Tub 12 comprises a stationary floor 20 carried by frame 14 at an angle with respect to horizontal, and a cylindrical tub side wall 22 mounted for rotation on the frame. A hydraulicly operated loading apparatus 24 is removably attached to frame 14 and projects laterally from the apparatus 10 for loading material such as round cylindrical bales of hay, straw, fodder or the like into the tub for comminution by apparatus 10 as may be required. Apparatus 24 is provided as an optional attachment and apparatus 10 can be loaded manually if desired.

Apparatus 10 is normally attached to a prime mover such as a farm tractor or the like and power for operating apparatus 10 is provided from the prime mover through a main power shaft 26. The power from shaft 26 is transmitted through a belt drive 28 to a shaft 30 for turning a rotary comminuting device broadly designated 32. Device 32 may be of any suitable configuration such as is conventionally employed in a hammer mill or the like. It has been found that the comminution of animal feeds such as hay, straw, fodder and similar materials can be advantageously effected with a chopping action rather than grinding which is conventionally accomplished with a hammer mill. For this reason, device 32 which is illustrated in the drawing comprises a chopper including a wheel 34 having a plurality of knife assemblies 36 secured to the wheel and projecting radially outwardly therefrom for engaging material in tub 12 as the wheel is rotated about the longitudinal axes of shaft 30. Tub floor 20 has an opening 38 positioned to permit the projection of device 32 into the tub interior so that the knives of the device can engage the material as the latter is moved past the device by the rotation of tub sidewall 22.

A portion of the power from shaft 26 is transmitted through a drive 40 and transmission 42 to a gear 44 for rotating the cylindrical sidewall 22 of the tub about its axis. A transversely circular rail 46 extends circumferentially around sidewall 22 and is complementally received within an arcuate groove 48 (FIG. 3) comprising an integral part of gear 44 so that rail 46 and gear 44 cooperate to hold the sidewall in its proper position above floor 20 and permit rotation of the sidewall about its axis. A grooved wheel 50 and a similar wheel 52 are also carried by frame 14 and all of the grooved wheels are disposed in circumferentially spaced relationship around the tub and cooperate with track 46 to mount sidewall 20 for rotation.

An elongated rigid band 54 extends around the outer surface of side wall 22 in concentric relationship thereto immediately beneath rail 46 as illustrated best in FIG. 3. Band 54 is rigidly secured to sidewall 22 by welding or other suitable fastening means and it is formed from an elongated transversely rectangular strip of steel which has been subjected to a bending operation to present a continuous series of regular undulations 56 at spaced apart intervals along the band in the manner illustrated. Gear 44 has a number of downwardly projecting stub shafts 58, each spaced around the perimeter of the gear as illustrated in FIG. 5. Each shaft 58 journals a roller 60 of an appropriate size and located for operably cooperating with the undulations of band 54 so that the rollers engage the band to impart power to tub sidewall 22 for rotating the latter during operation of apparatus 10.

It should be pointed out at this juncture that substantial economies can be effected in the manufacture of band 54 by the bending of an initially flat strip of steel into the appropriate undulated form. This obviates the expense which would be incurred in fabricating a large diameter toothed gear as is conventional in constructions of this kind. Further, the use of the spaced apart rollers mounted on gear 44 for driving the sidewall through the undulated band accommodates for minor variations in the regularity of the undulations, further achieving economies over what would be involved in the use of conventional cog and gear construction. It has been found that this construction serves very well for of rotating sidewall 22 during operation of apparatus 10 and the cost of fabrication of the components is a mere fraction of that which would be involved with machined tooth and gear construction.

One disadvantage heretofore encountered with tub choppers or grinders of the type contemplated by this invention is that round bales of material in the tub do not uniformly contact the rotating chopping or grinding apparatus. The knives or other comminuting devices project furthest into the tub immediately above the axis of rotation of the device. Accordingly, a deeper bite is taken from the material at this location than is taken from the material located either toward the center of the tub or toward the extreme outer margin of the latter. As a result, large bales of material sometimes are cut by the device in a manner which forms a concavity in the underside of the bale. This retards against uniform processing of the material through the apparatus. Bales having a length approximately the diameter of the tub are particularly difficult to process for this reason.

Applicant has found that the problems associated with the phenomenon just described can be aleviated by a novel configuration of the tub floor contour. This contour enhances uniform movement of material to the chopping assembly. The improved floor configuration is provided by means of a transversely arcuate, convex floor portion 62, illustrated best in FIGS. 11 and 12. This arcuate floor portion begins to arise from the floor at a location approximately 180° upstream from the comminution device 32 and tapers generally uniformly upwardly with a gradually decreasing radius of curvature until the portion terminates at device 32. In addition, the outermost edge of this arcuate portion generally coincides with the outer edge of the tub where the portion begins and it decreases gradually as the comminuting device 32 is approached. This is indicated in FIG. 2 of the drawing by the line 64 which represents the outer edge of this arcuate portion.

The final quarter of the convex floor surface is formed as a separate section or wing 66 hingedly secured to the remainder of the floor by an elongated hinge 68 extending approximately one half of the distance across the floor as illustrated in FIG. 2. At its terminal end, wing 66 has a cross-sectional configuration generally conforming to a peripheral edge of the rotatable cutting device 32 defined by the path of travel of the cutter knives.

Wing 66 is operably coupled with a rotatable fore and aft extending shaft 70 having a handle 72 so that rotation of the shaft by the handle lifts or lowers wing 66 about hinge 68 to raise or lower the terminal edge of the wing. Thus, the wing serves as a guage so that material in the tub sliding along the wing is exposed to the depth at the chopping station as may be desired by the operator. The convex floor surface tapered in the manner described tends to eliminate undesirable bridging and facilitates movement of the bale in a manner to produce even and uniform presentation of the material to the comminuting device. The undersurface of the bale tends to be supported substantially uniformly by the contoured floor after the bale has been exposed to the cutting action, thereby minimizing the tendency for a bale to move in a manner that it is not returned to contact with the cutting device as it moves around the tub floor.

The tub sidewall rotates in a clockwise direction as viewed in FIG. 2 for normal operation of the machine action. Occasionally, it may be desired to reverse the movement of the tub sidewall. For this purpose, the tub floor is provided with a small integral convex region 74 on the opposite side of opening 28 from wing 66. Region 74 serves to gently elevate material moving in a counterclockwise direction as viewed in FIG. 2 as the material slides into engagement with the rotating device 32.

Referring particularly to FIG. 13, it may be seen that floor 20 has a downwardly extending slanting portion 74 immediately upstream from device 32. Wing 66 is provided with a depending portion 76 configured to complementally over is this portion 76. Portion 76 serves to prevent long strands of material from being drawn into the cutting chamber without having first having had sufficient exposure to the cutting knives to cut the strands into smaller sections. If not properly cut, the long strands tend to overload the cutting device and choke the machine. In other words, portion 76 guides the material to the zone of exposure to the knives to insure that the material is chopped thereby.

It has been found to be particularly important to insure that the edge of the material guide immediately upstream of the cutting device is projected down below the general plane of the tub floor in order to accomplish uniform chopping of the material and to prevent the tendency of the machine to be slugged or overloaded during the chopping operation. Material resting on the support provided by the floor is moved at a greater lineal speed proximal the tub sidewall than near the tub axis. It has been discovered that there is a tendency for a substantially larger amount of material to be drawn down into the cavity around the cutter device or wheel at the outermost extremity thereof than elsewhere along the wheel. Thus, the wing 66, and more particularly the arcuate terminal edge thereof immediately upstream from the cutter device, is extended well below the level of material support defined by floor 20. This extension permits control of the amount of exposure of the cutter to the cutting wheel even well below the floor level in the region at the outer extremity of device 32. Such control below the level at which the material in the tub is supported has been found critical for smooth, anti-clogging operation of the apparatus.

For best results the wing or deflector in this region should extend in general conformity to the curved periphery of the cutter wheel or device 32 substantially below the floor and preferably from at least four inches to about twelve inches below floor level. Good results have been obtained by extending this portion of the wing or deflector gauge downwardly to about the level of the axis of rotation of the wheel as is illustrated in FIG. 13. The extension below the general level of the material support should subtend an arc of about ten to twenty degrees of the circle defined by the cutter periphery.

Another feature of apparatus 10 designed to minimize or eliminate slugging or overloading of the power source is the provision of speed control apparatus designated by the reference numeral 78. Apparatus 78 includes structure for reducing the force transmitted to the tub sidewall 22 to slow the speed of rotation of the latter responsive to reduction in the speed of rotation of the power source. Thus, if the comminution device 32 becomes overloaded or slugged with material to the extent that the rotating speed of the power source is diminished, apparatus 78 effectively reduces the speed of rotation that tub sidewall 72 to diminish the feed of material to the comminution device until the normal speed of rotation of the latter is resumed. Apparatus 78 includes a sheave 80 operably coupled to a main power drive for apparatus 10. A speed responsive device 82 includes a housing 84 rigidly secured to sheave 80 for rotation therewith. A pair of opposed crank arms 86 are pivotly coupled to housing 84 and have weights 88 on the outermost legs of the cranks so that the arms 86 tend to be moved outwardly under the influence of centrifical force as housing 84 is rotated. Such pivotal movement of cranks 86 cause a plunger 90 to be shifted in a direction to elongate spring 92 as will be readily understood by those skilled in the art. Spring 92 is coupled with plunger 90 through a crank mechanism 94 and one end of the latter is secured to a rod 96 mounting a stub shaft 98. Shaft 98 mounts an idler pulley 100 which is positioned to engage belt 102 of the power transmission 42 which drives gear 44 to rotate the tub sidewall. Shaft 98 is, in turn, carried by an arm 104 which is pivotally mounted to the machine frame.

The arrangement just described is such that spring 92 exerts a biasing force tending to pull pulley 100 in a direction to loosen belt 102 to permit slippage in transmission 42 and thus diminish the power provided for rotating the tub sidewall. With the machine in normal operation, however, the speed of rotation of housing 84 derived from the power transmitted from the main power source is such that device 82 overcomes the bias of spring 92 and forces idler pulley 100 against belt 102 to tighten the belt and insure the transmission of driving force to rotate the tub sidewall. When the power consumed by the operation of apparatus 10 is such, as when the comminution device becomes overloaded, to reduce the speed of rotation of the main drive, speed control apparatus 78 automatically reduces the transmission of the motive force to the tub sidewall to slow the speed of the latter. This action temporarily diminishes the normal movement of material to the comminution device so that the latter is better able to handle the material already at the comminution station and prevents slugging or overloading of the machine. Once the comminution device has overcome the slug of material at the station, the speed of the main drive increases whereupon the speed governing device associated with the tub sidewall resumes its normal operating condition to permit the continued application of rotative force to the tub sidewall.

An important feature of the present invention resides in the provision of novel chopping knives for the comminution device 32. As has been pointed out, the material frequently handled by apparatus 10 commonly involves straw, hay and similar materials having a high cellulose content and such materials have a tendency to wear the cutting edges of the chopping knives, increasing the horsepower requirements for the machine. This wearing action has a tendency to occur primarily at the outermost tips of the blades. Conventional sickle sections have heretofore been employed for cutting knives. Such sections typically present a pair of cutting edges and when the outer portions of these edges become worn, the sections are commonly removed and discarded.

Referring now particularly to FIGS. 8, 9 and 10, a novel knife embodying the principles of this invention is broadly designated by the reference numeral 104. Knife 104 comprises a substantially flat, generally triangularly shaped body 106 having three elongated, sharpened cutting edges 108, 110 and 112, respectively, disposed peripherally around the body. As is apparent in FIG. 10 of the drawings each of the edges of the knife substantially defines one side of the body. An aperature 114 may be provided in the geometric center of the knife body and extends transversely therethrough to cooperate with a boss 116 integral with a holder 118 for mounting the knife in its proper cutting position as illustrated best in FIGS. 8 and 9. Holder 118 is provided with a pair of V shaped notches 120 and 122, each notch having a pair of inclined surfaces 124 designed to complementally embrace the proximal flat surface of a corresponding knife 104 to hold the latter in the respective positions illustrated best in FIG. 8. Holder 118 is thus configured to mount four knives 104 in the upwardly projecting and outwardly diverging positions thereof shown in the drawings. A generally E shaped retainer 126 is configured to overlie holder 118 and has a pair of projecting legs 128 and 130' projecting between each respective pair of knives 104. The side edges of the legs 128 are configured to complementally engage the proximal surfaces of the respective knives 104 to firmly clamp the latter in the positions illustrated. Retaining bolt 130 received through a retainer leg 131 securedly clamps retainer 126 to holder 118 so that the knives may be removed from the position illustrated only upon the removal of bolt 130. Further, the inherent elasticity of the E shaped construction of retainer 126 provides spring like clamping forces tending to accommodate for any lack of smoothness to the clamping surfaces and insures that the knives are held securely.

Each holder 118 has an integral leg 134 adapted to be secured to wheel 34 of the comminuting device 32 so that the knives 104 are mounted at regularly spaced intervals in radially projecting relationship on the wheel. Flange 136 integral with each leg 134 serves to reinforce the assembly.

It will be readily understood by those skilled in the art that the novel knives 104 in the associated holding structure may be quickly and easily changed to present fresh and sharp cutting edges for the comminuting device. For example, if a knife 104 illustrated in FIG. 10 is mounted on the wheel so that its normal direction of rotation is to the right as viewed in that figure of the drawing, the leading uppermost end of edge 108 will receive a major portion of the wear. When this portion of 108 becomes sufficiently worn or dulled as to substantially increase the horsepower requirements for operating apparatus 10, the operator may loosen bolt 130 and rotate the position of knife 104 so that cutting edge 112 is disposed in the position presently occupied by edge 108. When edge 112 subsequently becomes worn in the manner heretofore described, knife 104 may again be rotated to bring edge 110 into this cutting position. Once the knife has been used after it has been rotated to each of the three positions described above, the outermost projecting portion of each blade edge will have become dulled. The lowermost portion of the edges will not, to this time, have been substantially exposed to the dulling effects of the cutting operation. Thus, the operator may simply turn the knife over to reverse the positions of the flat sides, whereupon the heretofore substantially unworn portions of the sharpened blade edges will now be at the uppermost projecting ends of the knife. The operator may thereupon repeat the step of successive rotation of respective knife edges until each sharpened end of the edges has been rotated through the cutting position.

It is now apparent that the novel cutting knife 104 presents to the operator the potential of six sharpened positions instead of the two sharpened positions heretofore available with conventional sickle sections. Although the construction of knife 104 has particular application for use in a tub chopper of the type described, it will be readily apparent that this construction may be advantageously utilized in a variety of other applications. For example, such blade construction may be used to advantage in any of a number of apparatus designed for cutting or chopping, such as in a conventional sickle bar mower, harvester or the like.

It has been found that the proper comminution of material with machines such as apparatus 10 can be better assured by providing a grid in association with the comminution device. To this end, applicant has provided a grid 138 disposed interiorily in the chopping device housing 140 and extending in radially outwardly spaced parallelism from the path of travel of knives 104 of the device. Grid 138 comprises a plurality of elongated spaced apart side by side longitudinal bars 142 interconnected by a plurality of spaced apart cross bars 144 to thereby define a mesh of a size deemed appropriate for the material involved. A plurality of teeth 146 may be rigidly secured to bars 142 or bars 144 at inwardly projecting, spaced apart positions along the length of grid 138 as illustrated in the drawing. Teeth 146 are disposed at positions where they will not interfere with the path of travel of the respective knives 104 and will project generally between the projecting knives whereupon relatively long strands of material will have a tendency to be caught by teeth 146 to be severed by the rotating knives 104. All the material which has been severed to an extent that its size is sufficient to pass through the mesh of the grid goes through the latter to the material discharge 148. Any material which has not been comminuted to the required size is carried by the rotating knives 104 through device 32 for a subsequent trip along the grid until it is reduced to the appropriate size. Grid 138 is secured in inwardly spaced apart relationship from housing 140 by a plurality of bolts 150 and spacers 152.

Another embodiment of chopping knives for comminution device 32 which embodiment is designed to further minimize the time and expense associated with knife wear is illustrated in FIGS. 14, 15 and 16 of the drawings. In this form of the invention, the knives 154 are disc shaped and have a single circular peripheral cutting edge 156. The discs may be either flat or dish shaped as shown in the drawings, depending upon what may be preferred for particular materials to be handled by the apparatus. In the embodiment illustrated, four discs 154 are mounted on a single shaft 156 by a holder 158 and a retainer 160. A bearing 162 rotatably mounts shaft 156 and the discs 154 are held in spaced apart relationship by spacers 164. A grease fitting 166 is in communication with the bores 168 which threadably received retaining bolts 170. An opening 172 communicates with each of the bores 168 and is, in turn, communicated with an annular groove 174 around bearing 162 by a duct 176. This construction permits lubrication material to be introduced through the fitting for maintaining lubrication to the bearing.

It will be understood that each assembly mounting four knives 154 will be bolted to the rotatable cutter wheels 34 in substantially the manner described and illustrated in FIG. 7 referring to knives 104. Knives 154 are thus disposed in projecting relationship around wheel 34 in position for cutting material encountered by the comminution device 32. The single peripherally extending cutting edge 156 of each knife engages the material and tends to be rotated thereby causing rotation of shaft 156 in its bearing. As a result of this action on each of the four knives mounted on a single shaft rotate together during the cutting operation. This rotation of the knives continually brings different portions of the sharpened cutting edges of the respective knives into the cutting position. Thus, the knives tend to wear uniformly throughout their entire perimeters so that it is unnecessary to change knives until the entire edges are dull to the point that the horsepower requirements for the operation of apparatus 10 is increased substantially. Furthermore, the configuration of the discs may be such that the engagement of the material has a tendency to wear a disc edge in a "self sharpening" manner as is well known in art.

It will be readily appreciated that the disc knives incorporated in the chopping device 32 in the manner heretofore set forth reduces the down time hertofore involved in operations utilizing knives of conventional construction. Accordingly, with the knives embodying the principles of this invention, a given set of knives may be used for long periods of time before it is necessary to halt the operation to change the knives.

The operation of apparatus 10 is readily apparent from the foregoing description and reference to the disclosure contained in my co-pending application Ser. No. 229,347 filed Jan. 29, 1981, is incorporated herein by reference. Such machines have been found to be especially useful, not only for chopping feedstuffs for current animal consumption, but also for filling silos for feed storage for consumption at a later time. A farmer may bale his crop when it is ready and store it in baled form until he is ready to proceed with the silo filling operation. A variety of different crops may be harvested and stored in this manner. When the farmer is ready to put the feed into his silo, the bales are processed through the tub chopper where the proper particle sizes for the resultant ensilage is obtained. The bales of different crops may be appropriately selected during this processing to achieve the proper mix for the resultant ensilage.

It has been found that apparatus constructed pursuant to the principles of this invention is beneficially adapted to permit the addition of water to the chopped feed at the time it is processed through the machine, and in amounts suitable for the production good ensilage in the silo. Water is simply introduced into the comminutor housing by suitable fittings (not shown) for this purpose when the material is processed by the machine.

Corn and other grains may be admixed into the ration in a similar manner. Here again, such materials may be introduced through housing 140 by an auger or other suitable conveyor (not shown) communicating directly with the housing interior.

Workmen assisting with the loading of material into the tub are exposed to possibility that they might inadvertently fall into the tub and thereby be injured by the rotating cutter knives. A guard 178 for safeguarding against this possibility is provided in the region where the tub loading takes place. Guard 178 includes an elongated, U shaped rail 180 having its ends secured to the machine frame, and a cross bar 182 secured to rail 180. Guard 178 projects upwardly and inwardly from the lowermost lip of the tub sidewall in a position where it may be grasped by a workman to steady him against falling into the tub.

I claim:

1. In a tub comminuter of the kind having a stationary floor, a rotary material comminuting assembly projecting upwardly through the floor, and a rotatable tub sidewall for moving material in the tub into engagement with the assembly, the sidewall and floor conjointly defining the tub, an improved floor configuration to enhance movement of material to the assembly comprising:
   a transversely arcuate, convex floor portion extending upstream in the tub from said assembly and radially outwardly from the central axis of the tub, said portion having a curvilinear outermost edge;
   the radius of curvature of the convexity of the portion gradually decreasing in the direction of movement of the material toward the assembly; and
   the width of said convex portion measured radially of the tub gradually decreasing in said direction of movement of material toward the assembly.

2. The invention of claim 1, wherein the end of said portion remote from the assembly is substantially coplanar with the floor and wherein said portion tapers upwardly with the end of the portion proximal the assembly curving upwardly in general concentricity with the assembly.

3. The invention of claim 1, wherein said floor portion extends throughout approximately 180° of the tub.

4. The invention of claim 1, wherein said portion is comprised of a pair of sections, and wherein is provided structure mounting one of the sections for swinging movement toward and away from said floor, said structure including means for releasably retaining said section at a predetermined position with respect to the floor.

5. The invention of claim 4, wherein said one section terminates proximal the assembly, whereby the degree of engagement of the material is regulated by the position of the section relative to the floor.

* * * * *